(No Model.)

L. A. SHERMAN.
SADDLE FOR BICYCLES.

No. 468,398. Patented Feb. 9, 1892.

Witnesses.
E. J. Slough
A. Keithley.

Inventor
Louis A. Sherman
By H. W. Wells,
Atty.

UNITED STATES PATENT OFFICE.

LOUIE A. SHERMAN, OF PEORIA, ILLINOIS.

SADDLE FOR BICYCLES.

SPECIFICATION forming part of Letters Patent No. 468,398, dated February 9, 1892.

Application filed May 19, 1891. Serial No. 393,253. (No model.)

*To all whom it may concern:*

Be it known that I, LOUIE A. SHERMAN, a citizen of the United States, residing at Peoria, in the county of Peoria and State of Illinois, have invented certain new and useful Improvements in Rocking Saddles for Bicycles; and I do hereby declare that the following is a full, clear, and exact description of the invention, which will enable others skilled in the art to which it appertains to make and use the same.

Figure 1:
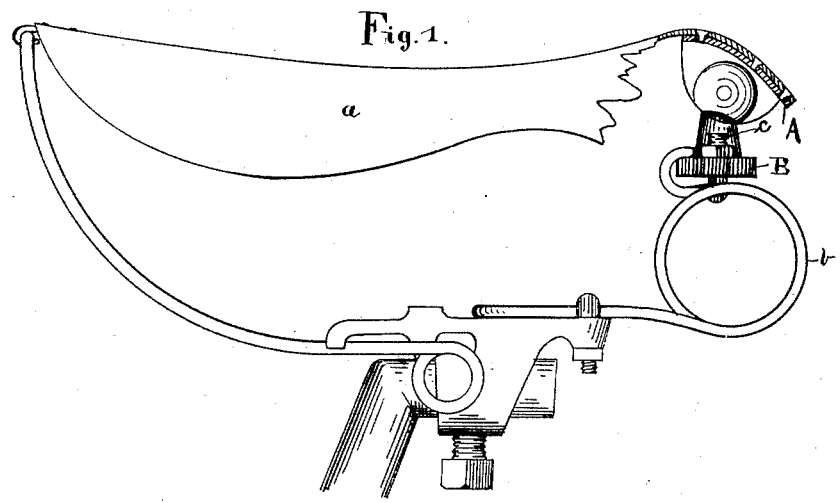
Figure 2:
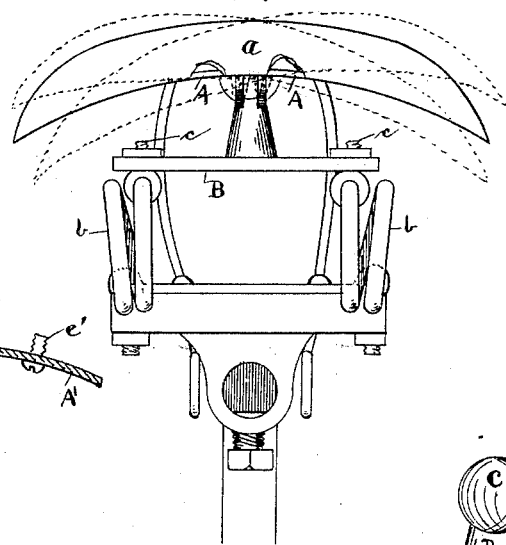
Figure 4:
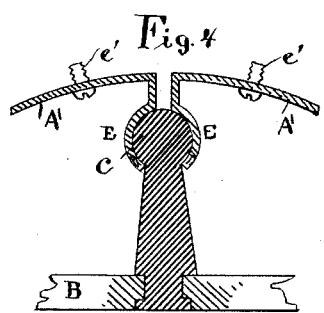
Figure 3:
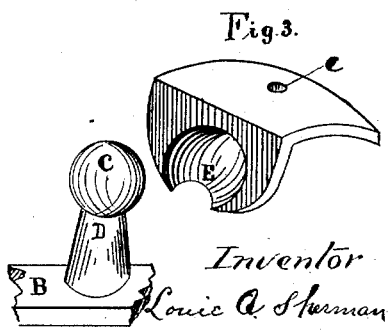

In the accompanying drawings, Figure 1 is a side elevation of the saddle, partly broken away to show the pivot connection. Fig. 2 is a rear elevation of same, showing in dotted lines the tilting movement; and Figs. 3 and 4 show details of the connections between the seat and spring.

This invention is for an improvement in saddles for bicycles; and it consists in mounting saddles for bicycles upon the machine in such manner that they may have a rocking motion corresponding with the action of the driver's feet upon the pedals.

I accompany this specification with drawings of my invention, in which like parts are marked with like letters, and by reference thereto I will describe it.

$a$ is the seat of the saddle, and is constructed in any ordinary form and of any ordinary material. The front part is narrow and the rear part, upon which the rider sits, is sustained by a metal strip extending transversely across the rear of the seat, properly shaped and fastened thereto, as is ordinarily used in such seats.

B is a metal strip fastened to and connecting springs $b\ b$, and is best shown in Fig. 2. Some saddles are supported by a single spring, in which case this strip is unnecessary, and the ball-and-socket joint hereinafter mentioned may be fastened direct to the spring, and in such cases a simple joint movable for a short distance may be used in place of the ball and socket.

C D E is a ball-and-socket joint held and supported upon the metal strip B.

$e'\ e'$ are the screws which fasten A' to the strip under the rear of the saddle-seat, thus holding the ball of the socket firmly in place. The construction of these parts is shown in Figs. 3 and 4. The socket for this joint is most easily formed in halves and is forged homeogeneous with A'. The rocking motion of the saddle is shown by the dotted lines in Fig. 2. I construct this ball and socket preferably of steel, the socket in halves, as shown in the drawings, each half being fastened by the screws $e'\ e'$ to the metal strip A under the rear part of the saddle $a$. The front of the saddle is narrow, and as the seat is flexible does not interfere with the rocking motion thereof; but it may be supported upon any ordinary joint or upon a ball-and-socket joint, if such construction is thought best.

It must be observed that as ordinarily constructed a bicycle-saddle is rigidly fastened to the machine, so that when the rider forces down one pedal there is a resisted tendency to force down that side of the saddle, and so alternately there is a resisted tendency caused by the rigidity of the saddle to depress that side of the saddle on which the pedal is down. A saddle thus mounted is hard to ride, it is galling to the rider, it interferes with and shortens the reach of the foot to the pedal, and it is especially damaging to clothing of the rider.

My invention obviates the difficulties stated by so mounting the saddle that this tendency to depress the side upon which the pedal is down has free play. I construct the support for the saddle so as to permit the sides thereof severally to be depressed, corresponding with the motion of the rider's feet, each side will rise and fall alternately with the rise and fall of the pedals. I thus do away with the unpleasant features of the rigid seat and substitute a pleasant rocking motion.

There are many other ways by which a rocking motion may be given to the saddle, as has before been stated. I do not, therefore, wish to be confined to the ball-and-socket joint, though I regard that as the best; but I claim any means of supporting the saddle which will permit it to rock sidewise under the motion of the rider's feet.

Having thus described my invention, what I claim, and desire to secure by Letters Patent, is—

1. In combination, the bicycle-saddle $a$, the ball-and-socket joint C D E, placed vertically under the rear thereof, held and supported on the strip B, and the two springs connected by said strip, all acting in the manner and for the purpose set forth.

2. In a bicycle-saddle, in combination, the supporting-strip under and across the rear of the saddle, a support under said strip jointed and arranged to allow a limited oscillating motion of the saddle, and a spring or springs under and supporting said joint, all arranged in the manner and for the purposes set forth.

In testimony whereof I affix my signature in presence of two witnesses.

LOUIE A. SHERMAN.

Witnesses:
C. B. McDOUGAL,
MAE B. WASSON.